United States Patent
Hayashi

(10) Patent No.: US 12,394,987 B2
(45) Date of Patent: Aug. 19, 2025

(54) CONTROL CIRCUIT, DC-DC CONVERTER, AND ENERGY HARVESTING SYSTEM

(71) Applicant: Asahi Kasei Microdevices Corporation, Tokyo (JP)

(72) Inventor: Teppei Hayashi, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 17 days.

(21) Appl. No.: 18/391,723

(22) Filed: Dec. 21, 2023

(65) Prior Publication Data
US 2024/0297504 A1 Sep. 5, 2024

(30) Foreign Application Priority Data

Mar. 2, 2023 (JP) ................. 2023-032158
Nov. 10, 2023 (JP) ................. 2023-192001

(51) Int. Cl.
| | | |
|---|---|---|
| H02J 3/38 | (2006.01) | |
| H02J 3/12 | (2006.01) | |
| H02J 50/00 | (2016.01) | |
| H02M 3/07 | (2006.01) | |

(52) U.S. Cl.
CPC ............. *H02J 3/38* (2013.01); *H02J 3/12* (2013.01); *H02J 50/001* (2020.01); *H02M 3/07* (2013.01); *H02J 2300/26* (2020.01)

(58) Field of Classification Search
CPC .... H02J 3/38; H02J 50/001; H02J 3/12; H02J 2300/26; H02M 3/07
See application file for complete search history.

(56) References Cited

U.S. PATENT DOCUMENTS

| | | | |
|---|---|---|---|
| 6,014,300 A | 1/2000 | Yamashita | |
| 8,872,485 B1 | 10/2014 | Kung | |
| 2010/0046124 A1* | 2/2010 | Hibi ............... | H02H 7/1213 |
| | | | 361/18 |
| 2011/0221416 A1 | 9/2011 | Ivanov | |
| 2011/0241625 A1* | 10/2011 | LoCascio .......... | H02J 7/00 |
| | | | 320/140 |
| 2017/0054440 A1 | 2/2017 | Katsumata | |

FOREIGN PATENT DOCUMENTS

| | | |
|---|---|---|
| JP | 6152919 B1 | 6/2017 |
| JP | 2018074874 A | 5/2018 |

OTHER PUBLICATIONS

"Highly Efficient, Regulated Dual-Output, Ambient Energy Manager for AC or DC Sources with Optional Primary Battery", AEM30940 RF Energy Harvesting, https://e-peas.com/product/aem30940/, e-peas semiconductors, 2023.

\* cited by examiner

*Primary Examiner* — Carlos Amaya

(57) ABSTRACT

There is provided a control circuit which controls a DC-DC converter which boosts an output voltage of an input source and outputs the output voltage which has been boosted, in which the DC-DC converter has a boost coil, and a capacitor, and the control circuit includes: an input terminal into which the output voltage is input; a first transistor arranged between the input terminal, and the boost coil and the capacitor; and a switch activation unit which boosts the output voltage, and applies the output voltage, which has been boosted, to a control terminal of the first transistor.

18 Claims, 3 Drawing Sheets

CONTROL CIRCUIT, DC-DC CONVERTER, AND ENERGY HARVESTING SYSTEM

The contents of the following patent application(s) are incorporated herein by reference:
NO. 2023-032158 filed in JP on Mar. 2, 2023
NO. 2023-192001 filed in JP on Nov. 10, 2023

BACKGROUND

1. Technical Field

The present invention relates to a control circuit, a DC-DC converter, and an energy harvesting system.

2. Related Art

In the related art, an MPPT control circuit is known to have a first switch arranged in series between an RF-DC conversion circuit and a DC-DC converter. (Refer to Patent Document 1, for example).

PRIOR ART DOCUMENT

Patent Document

Patent Document 1: Japanese Patent No. 6152919

DESCRIPTION OF EXEMPLARY EMBODIMENTS

Hereinafter, the invention will be described through embodiments of the invention, but the following embodiments do not limit the invention according to claims. In addition, not all of the combinations of features described in the embodiments are essential to the solving means of the invention. In the present specification, the same parts in each figure are denoted by the same signs and numerals, and the descriptions thereof may be omitted. In addition, for convenience of description, some configurations may not be illustrated.

In the present specification, a case where a term such as "same" or "equal" is mentioned may include a case where an error due to a variation in manufacturing or the like is included. The error is, for example, within 10%. In addition, each terminal and component in the figure may be connected by using wiring or the like. Each ground terminal in the figure may be a common terminal or may be a separate terminal.

For electric power obtained from an energy harvesting source and the like, the power is typically low, a voltage and a current that can be extracted are low, and the power changes greatly over time due to a change in an environment thereof. A DC-DC converter is used to collect such a small amount of power, and boost the collected power to a voltage at which a sensor, a microcomputer, BLE, or the like is able to be operated.

Figure 1:
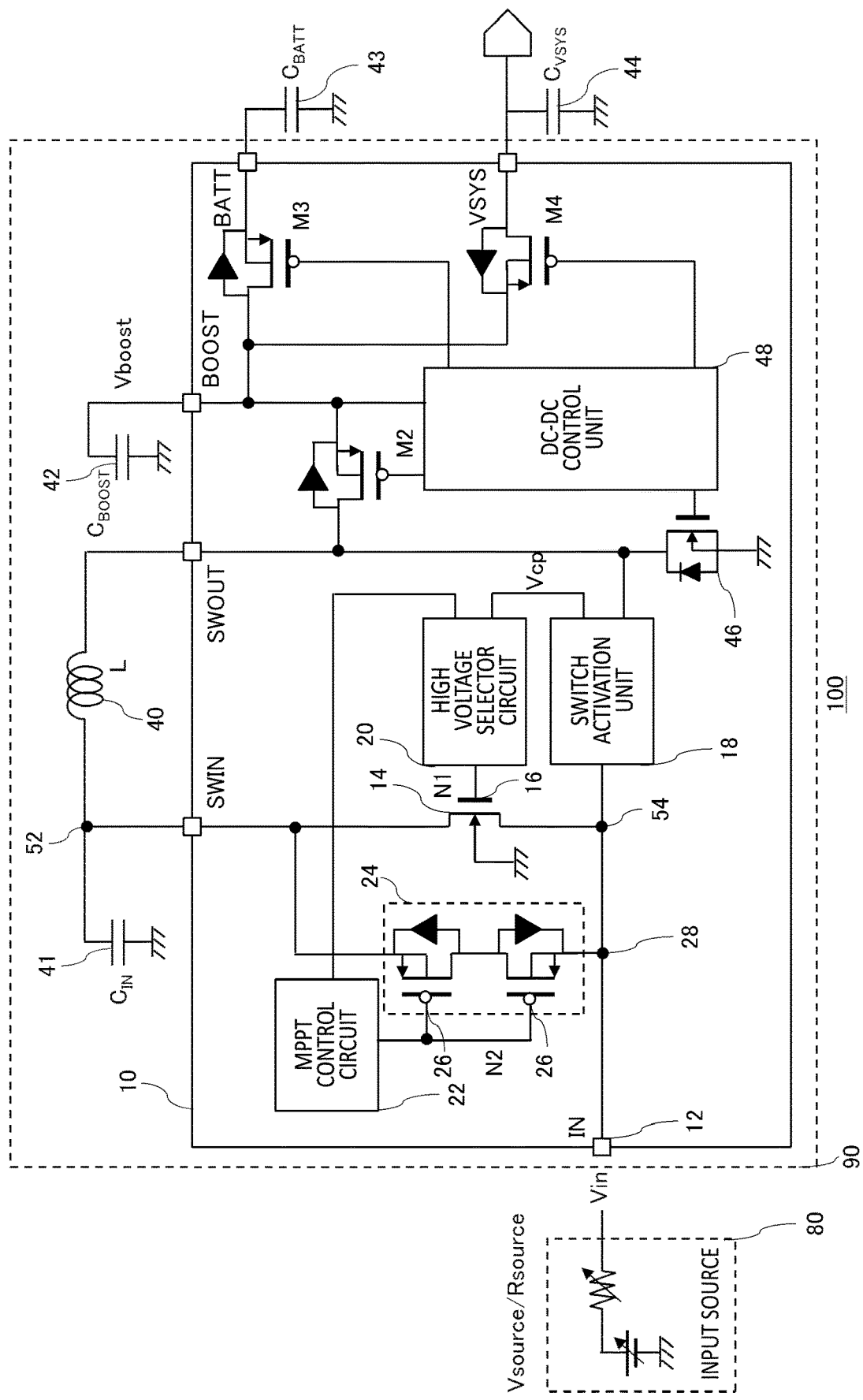
FIG. 1 is a diagram showing an energy harvesting system 100 according to a first example of the present invention.

FIG. 1 is a diagram showing an energy harvesting system 100 according to a first example of the present invention. The energy harvesting system 100 supplies power to an external device. The energy harvesting system 100 includes an input source 80 and a DC-DC converter 90. The input source 80 outputs an output voltage Vin to the DC-DC converter 90. The DC-DC converter 90 boosts the output voltage Vin of the input source 80 and outputs the boosted output voltage Vin. The DC-DC converter 90 is, for example, a step-up DC-DC converter.

The input source 80 may be the energy harvesting source, or may be a wireless power transfer. For example, the energy harvesting source is for: photovoltaic power generation which uses, as an energy source, light energy from sunlight, an incandescent lamp, a fluorescent lamp, an LED, or the like; heat power generation which uses, as the energy source, heat energy from heat generated by machinery, environment temperature, or the like; vibration power generation which uses, as the energy source, vibration generated by machinery or vibration of a bridge, a road, or the like; electromagnetic wave power generation which uses, as energy, an electromagnetic wave, an electric wave, or the like; organism power generation which is represented by a microbial fuel cell and which converts an amount of activity of a living being into the energy; and others. For the input source 80, an amount of power generation may change over time depending on the surrounding environment or the like.

The DC-DC converter 90 includes a control circuit 10, a boost coil 40, a first capacitor 41, and a second capacitor 42. The control circuit 10 controls the DC-DC converter 90. The control circuit 10 may be included in the DC-DC converter 90. The second capacitor 42 is charged by a boost operation of the DC-DC converter 90 which will be described below. In this manner, a boost voltage Vboost of the DC-DC converter 90 rises. The first capacitor 41 is connected to one end of the boost coil 40 to efficiently perform the boost operation.

The DC-DC converter 90 of the present example has a BATT terminal and a VSYS terminal. The BATT terminal may be connected to a battery (a third capacitor 43 in FIG. 1) included in the external device. The VSYS terminal is connected to a circuit of the external device and supplies source power to the circuit of the external device. In FIG. 1, a capacitor connected to the VSYS terminal is shown as a fourth capacitor 44.

The BATT terminal is connected to the second capacitor 42 via a third switch M3 of the control circuit 10. The VSYS terminal is connected to the second capacitor 42 via a fourth switch M4 of the control circuit 10. By controlling the third switch M3 and the fourth switch M4, supplying the power of the second capacitor 42 is switched to any between the BATT terminal or the VSYS terminal. In addition, the power may be supplied from the third capacitor 43 to the VSYS terminal by setting the third switch M3 and the fourth switch M4 to be in an on state at the same time.

The boost voltage Vboost is output to the external device via the fourth switch M4 and the terminal VSYS. Capacitance $C_{VSYS}$ of the fourth capacitor 44 may be less than a sum of capacitance $C_{BOOST}$ of the second capacitor 42 and capacitance $C_{BATT}$ of the third capacitor 43.

The control circuit 10 includes a boost switch 46 and a second switch M2. One end of the boost switch 46 is connected to the boost coil 40, and the other end is connected to the ground terminal. One end of the second switch M2 is connected to the boost coil 40, and the other end is connected to the second capacitor 42. The boost switch 46 and the second switch M2 are controlled in a complementary manner such that when one is in the on state, the other is in an off state. Alternatively, both of the boost switch 46 and the second switch M2 are controlled to be in the off state, or both are controlled to be in the on state. The boost switch 46 and the second switch M2 are, for example, an N channel MOSFET and a P channel MOSFET in which turning on and turning off are controlled by a drive signal. When the boost switch 46 is turned on and the second switch M2 is turned off by the drive signal, the current flows from an input terminal 12 to the ground terminal via the boost coil 40 and the boost switch 46, and the energy is stored in the boost coil 40. When the boost switch 46 is turned off and the second switch M2 is turned on, the energy stored in the boost coil 40 is charged to the second capacitor 42 via the second switch M2, and the boost voltage Vboost rises.

The control circuit 10 has a DC-DC control unit 48. The DC-DC control unit 48 is connected to each control terminal of the boost switch 46, the second switch M2, the third switch M3, and the fourth switch M4; and controls the turning on and the turning off of each switch. The DC-DC control unit 48 controls the boost operation by controlling the turning on and the turning off of the boost switch 46. By controlling the turning on and the turning off of the third switch M3 and the fourth switch M4, the DC-DC control unit 48 performs a control regarding whether to output the boost voltage Vboost to the third capacitor 43 (the BATT terminal) or to output the boost voltage Vboost to the external device (the VSYS terminal) as described above, or to perform both. When the output by the boost operation is not sufficient, an electric charge stored in the third capacitor 43 may be output to the external device.

Each switch may be a MOSFET, and may have a body diode. Each switch may have two MOSFETs connected such that directions of body diodes are directions opposite to each other. In that case, source terminals of the two MOSFETs may be connected to each other, and drain terminals may be connected to each other.

Here, a technology called MPPT (Maximum Power Point Tracking) will be described. The MPPT is a generic term for technologies in which an operation is performed at an optimal operating point to extract the maximum power of the energy harvesting source or the like represented by a solar cell. By calculating an operating point at which the energy of the energy harvesting source or the like can be efficiently extracted, and driving the DC-DC converter 90 at this operating point, an efficient energy conversion is possible. The control circuit 10 of the present example has an MPPT function. The DC-DC converter 90 of the present example performs an MPPT operation.

When the optimal operating point is searched for, an energy conversion circuit of the DC-DC converter 90 is temporarily powered off, and an open-circuit voltage Vsource of the input source 80 is measured. Alternatively, by connecting any load, output impedance Rsource of the input source 80 is measured. By calculating the operating point for efficiently extracting the energy of the input source 80 according to the obtained measured value, and operating the DC-DC converter 90 according to the calculated operating point, it is possible to match the output impedance of the input source 80 with input impedance of the DC-DC converter 90, and to efficiently perform the energy conversion.

When the output impedance Rsource of the input source 80 is measured by connecting the load for measurement, only the load for measurement is set in a state of being connected, and thus it is preferable for the first capacitor 41 or the like of the DC-DC converter 90 to be blocked from the input source 80. For example, when the load for measurement and the first capacitor 41 are in a state of being connected in parallel, the open-circuit voltage Vsource is not stabilized until the first capacitor 41 is charged, and it takes time to measure the output impedance Rsource. When the output impedance Rsource of the input source 80 has a high resistance (kΩ or more) and a drive force is small, this effect is noticeable.

For example, when capacitance of the first capacitor 41 is set to 10 μF and the output impedance Rsource of the input source 80 is set to 10 kΩ, it may take several hundred milliseconds for the open-circuit voltage Vsource to be stabilized such that it takes time to measure the open-circuit voltage Vsource. A period of measuring the open-circuit voltage Vsource or the output impedance Rsource of the input source 80 is set as an operating period (period) of the MPPT, and a time it takes for one measurement thereof is set as an operating time (duration). In the operating period of the MPPT, a time other than the operating time of the MPPT corresponds to a time during which the DC-DC converter 90 performs the boost operation. In order to secure the operating time of the DC-DC converter 90, the operating period of the MPPT has a predetermined ratio to the operating time of the MPPT. When the ratio of the operating period to the operating time of MPPT is set to 50 times, the MPPT operation can only be performed at a period of 10 seconds (several hundred milliseconds×50), and there is a problem that it is not possible to follow, in a high speed, the change in the power generation of the input source 80. This is not suitable particularly when the input source 80 is an energy harvesting source that is sensitive to the environmental change.

On the other hand, it is preferable for the first capacitor 41 to have a large capacity for high efficiency of boosting. For example, it is desirable to have capacitance on the order of several μF to several tens of μF. Therefore, in order to achieve the high efficiency of boosting and a high speed response of the MPPT, it is preferable to block the first capacitor 41, the boost coil 40, or the like from the input terminal 12 at a time of the MPPT. Specifically, a switch is provided between the input terminal 12 and a SWIN terminal to block a path at the time of the MPPT. As a result, the capacitance of the first capacitor 41 connected to the SWIN terminal is interrupted from the input terminal 12, and thus the operating point converges instantly even when the output impedance Rsource is high. That is, it becomes possible to measure the output impedance Rsource in a short time, and the operating time can be shortened. Since the operating time of the MPPT is short, the operating period of the MPPT can be shortened.

The control circuit 10 includes the input terminal 12 to which the output voltage Vin is input, and a first transistor 14 arranged between the input terminal 12 and the boost coil 40. This first transistor 14 is arranged between the input terminal 12 and the first capacitor 41. At the time of the MPPT operation, the first transistor 14 blocks the first capacitor 41 and the boost coil 40, from the input terminal 12. This makes it possible to perform the MPPT operation with a high frequency while the ratio between the operating period and the operating time of the MPPT is sufficiently maintained, and makes it possible to more efficiently convert even the energy of the input source 80 whose power generation capacity always changes. The first transistor 14 may be connected between a node 52 between one end of the boost coil 40 and one end of the first capacitor 41, and a node 54 between the input terminal 12 of the control circuit 10 and an input terminal of a switch activation unit which will be described below.

The first transistor 14 may be able to block all the capacitors included in the DC-DC converter 90 from the input terminal 12. At the time of the MPPT operation, the first transistor 14 may block all the capacitors from the input terminal 12.

However, in an initial stage of the boost operation before the MPPT operation, the second capacitor 42, the third capacitor 43, and the fourth capacitor 44 are not charged with the electric charges. The boost voltage Vboost is also started from a low state or a state in which the voltage is zero. Therefore, when the output voltage Vin of the input source 80 is lower than a threshold voltage of the first transistor 14, the first transistor 14 cannot be turned on. Therefore, for the DC-DC converter 90, the boost operation is not possible. In addition, even when the first transistor 14 is set to be turned on, a value of the voltage applied to a control terminal 16 of the first transistor 14 is not sufficiently high, and thus an on-resistance of the first transistor 14 is high and power conversion efficiency is poor.

In the input source 80 such as an RF energy harvester having a high output impedance, that is, a low power generation capacity, there is also a problem that the optimal operating point is shifted due to a leakage current of the first transistor 14. Therefore, it is preferable to use, as the first transistor 14, a transistor with a low leakage current, that is, a high off resistance. When a transistor with a low threshold voltage is used, a switching operation is possible with a low control voltage; however, the leakage current becomes high.

The control circuit 10 of the present example includes a switch activation unit 18 which boosts the output voltage Vin of the input source 80, and applies the output voltage Vin, which has been boosted, to the control terminal 16 of the first transistor 14. The switch activation unit 18 applies, to the control terminal 16, a switch activation voltage Vcp that is a boosted voltage. The switch activation unit 18 includes a charge pump as an example. The switch activation voltage Vcp may be higher than the threshold voltage of the first transistor 14, may be 1.2 times or more of the threshold voltage, and may be 1.5 times or more. The switch activation voltage Vcp may be twice or more of the output voltage Vin, may be three times or more, or may be five times or more. In this manner, the boost operation from a low voltage is possible.

The first transistor 14 may be the N channel MOSFET. The first transistor 14 may have a body diode. In the first transistor 14, two N channel MOSFETs may have a cascade connection such that the directions of the body diodes are directions opposite to each other. In that case, source terminals of the two MOSFETs may be connected to each other, and drain terminals may be connected to each other.

The control circuit 10 may have a high voltage selector circuit 20 which selects the voltage that is applied to the control terminal 16 of the first transistor 14. The high voltage selector circuit 20 selects whichever is higher of the switch activation voltage Vcp boosted by the switch activation unit 18, and the boost voltage Vboost boosted by the boost operation of the DC-DC converter 90. The boost voltage Vboost is supplied from an MPPT control circuit 22 which will be described below. In this manner, in the initial stage of the boost operation before the MPPT operation, it is possible to start the boost operation by the switch activation voltage Vcp; and when the boost voltage Vboost sufficiently rises, it is possible to switch to the MPPT operation, and to control the first transistor 14 by the boost voltage Vboost.

When the boost voltage Vboost rises to a predetermined voltage, the switch activation unit 18 may be brought into the off state. The predetermined voltage may be a voltage at which the MPPT operation is possible, and may be equal to or higher than the switch activation voltage Vcp.

The control circuit 10 may further include the MPPT control circuit 22 which outputs the boost voltage Vboost to the high voltage selector circuit 20. The MPPT control circuit 22 outputs, to the high voltage selector circuit 20, the boost voltage Vboost or a reference voltage lower than the boost voltage Vboost. The reference voltage may be 0V.

The control circuit 10 may have a second transistor 24 which is the P channel MOSFET arranged in parallel with the first transistor 14. The second transistor 24 is arranged between the SWIN terminal and the IN terminal. The output voltage Vin of the input source 80 may be applied to a source terminal 28 or a drain terminal of the second transistor 24. The second transistor 24 may have a body diode. In the second transistor 24, two P channel MOSFETs may have a cascade connection such that the directions of the body diodes are directions opposite to each other. In that case, source terminals of the two MOSFETs may be connected to each other, and drain terminals may be connected to each other.

The output voltage Vin is applied to the source terminal 28 of the second transistor 24 in the present example. The MPPT control circuit 22 outputs, to a control terminal 26 of the second transistor 24, the boost voltage Vboost or the reference voltage lower than the boost voltage Vboost. The MPPT control circuit 22 may output a control signal for causing the first transistor 14 and the second transistor 24 to transition to the on state in synchronization, and to transition to the off state in synchronization.

The MPPT control circuit 22 measures the input source 80. The MPPT control circuit 22 may measure the open-circuit voltage Vsource or the output impedance Rsource of the input source 80. The DC-DC control unit 48 controls the operation of the DC-DC converter 90 based on a measurement result in the MPPT control circuit 22. The DC-DC control unit 48 may control the operation of the DC-DC converter 90 to have the operating point (the input voltage) of the DC-DC converter 90 in accordance with the value of the measured open-circuit voltage Vsource. The DC-DC control unit 48 may control the operation of the DC-DC converter 90 such that the value of the measured output impedance Rsource matches the input impedance of the DC-DC converter 90. The controlling of the operation of the DC-DC converter 90 means, as an example, adjusting timings of the turning on and the turning off of the boost switch 46.

Figure 2:
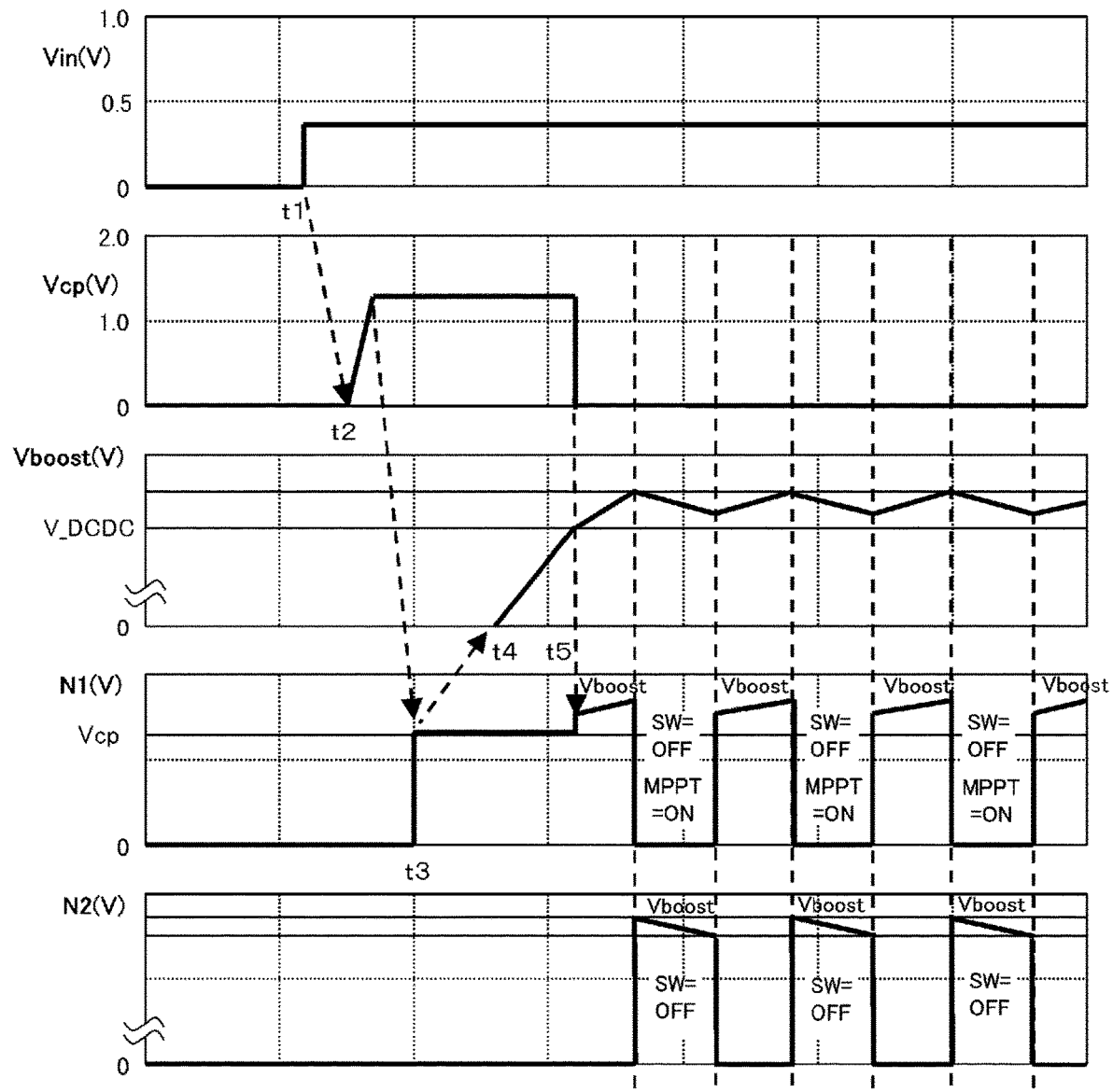
FIG. 2 is a diagram showing a change over time in each voltage when a boost operation is started.

FIG. 2 is a diagram describing a change over time in each voltage when a boost operation is started. The horizontal axis of each graph in FIG. 2 represents a time, and the vertical axis represents a voltage. The graph shows, from the top, the output voltage Vin, the switch activation voltage Vcp, the boost voltage Vboost, an application voltage N1 of the control terminal 16, and an application voltage N2 of the control terminal 26.

The input source 80 starts the power generation and outputs the output voltage Vin at a certain timing (t1). Here, the output voltage Vin is assumed to be constant to simplify the description. After that, the switch activation unit 18 starts boosting the voltage (t2), and the switch activation voltage Vcp rises. After that, the switch activation voltage Vcp is applied to the control terminal 16 of the first transistor 14 (t3). In this manner, the first transistor 14 is turned on, the boost operation of the DC-DC converter 90 is started (t4), and the boost voltage Vboost rises. When the boost voltage Vboost rises to a voltage at which a DCDC operation is possible (t5), the switch activation unit 18 is turned off and the switch activation voltage Vcp becomes 0V. The DCDC operation means that the switch activation unit 18 is turned off, and the MPPT control circuit 22 and the DC-DC control unit 48 are operated by the boost voltage Vboost.

Subsequently, the DC-DC converter 90 switches to the DCDC operation. During a period in which the boost voltage Vboost is output to the high voltage selector circuit 20, the MPPT control circuit 22 applies the reference voltage lower than the boost voltage, to the control terminal 26 of the second transistor 24. In this manner, the MPPT control circuit 22 controls the turning on and the turning off of both of the first transistor 14 and the second transistor 24. The reference voltage may be 0V. That is, during the period in which the MPPT control circuit 22 outputs the boost voltage Vboost to the high voltage selector circuit 20, at least either one of the first transistor 14 or the second transistor 24 is in the on state, and the DC-DC converter 90 performs the boost operation. During the period described above, both of the first transistor 14 and the second transistor 24 may be in the on state. In addition, during a period in which the reference voltage is output to the high voltage selector circuit 20, the MPPT control circuit 22 applies the boost voltage Vboost, to the control terminal 26 of the second transistor 24. In FIG. 2, during a period in which the voltage N1 is 0V and the voltage N2 is the boost voltage Vboost, both of the first transistor 14 and the second transistor 24 are turned off. During this period, the MPPT control circuit 22 measures the output impedance Rsource of the input source 80, and the DC-DC control unit 48 adjusts the input impedance of the DC-DC converter 90. The MPPT control circuit 22 may also measure the open-circuit voltage Vsource of the input source 80. That is, the MPPT control circuit 22 may control the first transistor 14 and the second transistor 24 to be in the off state, while the open-circuit voltage Vsource or the output impedance Rsoure of the input source 80 is measured. The MPPT control circuit 22 may control at least either one of the first transistor 14 or the second transistor 24 to be in the on state, while the DC-DC converter 90 performs the boost operation. Note that the second transistor 24 may not be provided. In that case, the MPPT control circuit 22 controls the turning on and the turning off of the first transistor 14.

The voltage N2 is fixed to the reference voltage until the DCDC operation is started. Therefore, when the output voltage is sufficiently high, the second transistor 24 is turned on instantly, and the boost operation of the DC-DC converter 90 is started.

When a potential of the boost voltage Vboost becomes high to be equal to the output voltage Vin at the time of the DCDC operation, the on-resistance of the first transistor 14 which is the N channel MOSFET, becomes high. In that case, when the second transistor 24 is present, the second transistor 24 can be turned on with an on-resistance lower than that of the first transistor 14. Therefore, the on-resistance due to the switch can be reduced over a wide range of the output voltages Vin.

Figure 3:
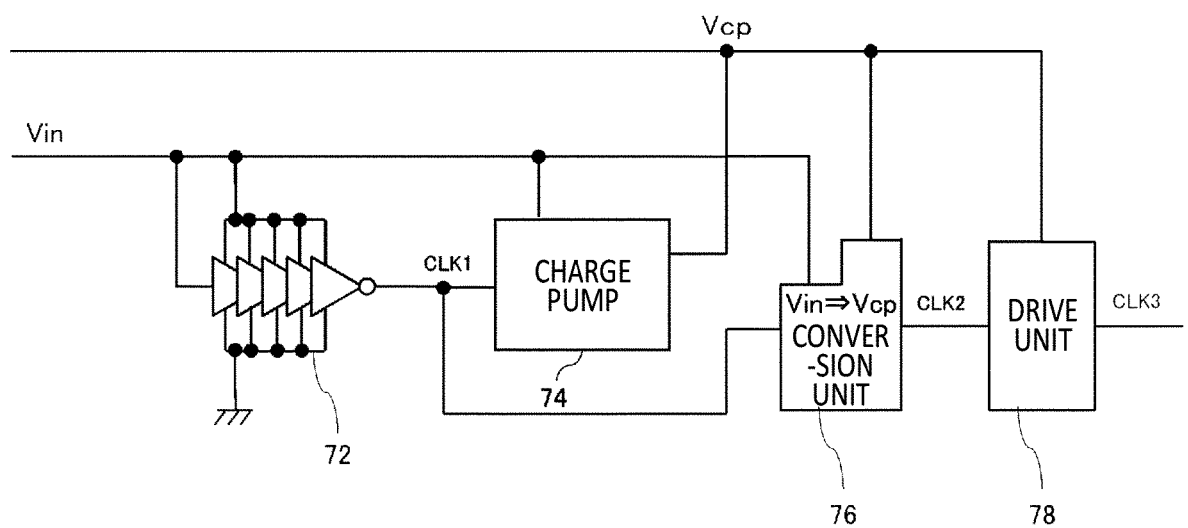
FIG. 3 is a diagram showing an example of a switch activation unit 18.

FIG. 3 is a diagram showing an example of a switch activation unit 18. The switch activation unit 18 of the present example includes an oscillator circuit 72, a charge pump 74, a conversion unit 76, and a drive unit 78.

The oscillator circuit 72 is, for example, a ring oscillator. The ring oscillator is a voltage control oscillator that uses the output voltage Vin as a control voltage, and outputs an oscillation signal CLK1 having a frequency in accordance with the output voltage Vin. As the output voltage Vin rises, an oscillation frequency may also rise. An amplitude (a wave height value) of the oscillation signal CLK1 is the boost voltage Vin.

The charge pump 74 boosts the output voltage Vin to switch activation voltage Vcp. The switch activation voltage Vcp is output to the control terminal 16 of the first transistor 14. The conversion unit 76 outputs a signal CLK2 obtained by converting an amplitude Vin of the input oscillation signal CLK1 into the switch activation voltage Vcp.

The drive unit 78 adjusts a pulse width of the signal CLK2. The signal CLK2 has a pulse width dependent on the output voltage Vin in an oscillation operation in the oscillator circuit 72. The drive unit 78 outputs a signal CLK3 whose pulse width is changed from the pulse width dependent on the output voltage Vin to a fixed pulse width. The signal CLK3 may be input to the control terminal of the boost switch 46. In this case, the turning on and the turning off of the boost switch 46 is controlled by the frequency, the amplitude, and the pulse width of the signal CLK3, and the boost operation of the DC-DC converter 90 is performed.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

EXPLANATION OF REFERENCES

10 . . . control circuit, 12 . . . input terminal, 14 . . . first transistor, 16 . . . control terminal, 18 . . . switch activation unit, 20 . . . high voltage selector circuit, 22 . . . MPPT control circuit, 24 . . . second transistor, 26 . . . control terminal, 28 . . . source terminal, 40 . . . boost coil, 41 . . . first capacitor, 42 . . . second capacitor, 43 . . . third capacitor, 44 . . . fourth capacitor, 46 . . . boost switch, 48 . . . DC-DC control unit, 52 . . . node, 54 . . . node, 72 . . . oscillator circuit, 74 . . . charge pump, 76 . . . conversion unit, 78 . . . drive unit, 80 . . . input source, 90 . . . DC-DC converter, 100 . . . energy harvesting system.

What is claimed is:

1. A control circuit which controls a DC-DC converter which boosts an output voltage of an input source and outputs the output voltage which has been boosted, wherein the DC-DC converter has:
    a boost coil; and
    a capacitor, and
    the control circuit comprises:
    an input terminal into which the output voltage is input;
    a first transistor one end of which is coupled to the input terminal and another end of which is coupled to a node between one end of the boost coil and one end of the capacitor; and
    a switch activation unit which boosts the output voltage, and applies the output voltage, which has been boosted, to a control terminal of the first transistor.

2. The control circuit according to claim 1, further comprising:
    a high voltage selector circuit which selects a voltage that is applied to the control terminal of the first transistor, wherein
    the high voltage selector circuit selects whichever is higher of a switch activation voltage boosted by the switch activation unit, and a boost voltage boosted by a boost operation of the DC-DC converter.

3. The control circuit according to claim 2, wherein when the boost voltage rises to a predetermined voltage, the switch activation unit is brought into an off state.

4. The control circuit according to claim 3, further comprising:
an MPPT control circuit which outputs the boost voltage to the high voltage selector circuit.

5. The control circuit according to claim 4, wherein the first transistor is an N channel MOSFET,
the control circuit has a second transistor which is a P channel MOSFET arranged in parallel with the first transistor,
the output voltage is applied to a source terminal of the second transistor, and
during a period in which the boost voltage is output to the high voltage selector circuit, the MPPT control circuit applies a reference voltage lower than the boost voltage, to a control terminal of the second transistor.

6. The control circuit according to claim 4, wherein the MPPT control circuit measures an open-circuit voltage or an output impedance of the input source, and
the control circuit further comprises a DC-DC control unit which controls an operation of the DC-DC converter based on a measurement result in the MPPT control circuit.

7. The control circuit according to claim 5, wherein the MPPT control circuit measures an open-circuit voltage or an output impedance of the input source,
the control circuit further comprises a DC-DC control unit which controls an operation of the DC-DC converter based on a measurement result in the MPPT control circuit, and
the MPPT control circuit controls the first transistor to be in an off state, while the open-circuit voltage or the output impedance of the input source is measured, and controls at least either one of the first transistor or the second transistor to be in an on state, while the DC-DC converter performs the boost operation.

8. The control circuit according to claim 1, wherein the first transistor is coupled to a node between the input terminal of the control circuit and an input terminal of the switch activation unit.

9. A DC-DC converter comprising:
the control circuit according to claim 1.

10. An energy harvesting system comprising:
the DC-DC converter according to claim 9; and
the input source which outputs the output voltage to the DC-DC converter.

11. The control circuit according to claim 5, wherein the MPPT control circuit measures an open-circuit voltage or an output impedance of the input source, and
the control circuit further comprises a DC-DC control unit which controls an operation of the DC-DC converter based on a measurement result in the MPPT control circuit.

12. A DC-DC converter comprising:
the control circuit according to claim 2.

13. A DC-DC converter comprising:
the control circuit according to claim 3.

14. A DC-DC converter comprising:
the control circuit according to claim 4.

15. A DC-DC converter comprising:
the control circuit according to claim 5.

16. A DC-DC converter comprising:
the control circuit according to claim 8.

17. The control circuit according to claim 1, further comprising a boost switch one end of which is coupled to the other end of the boost coil and another end of which is coupled to a ground terminal.

18. A control circuit which controls a DC-DC converter which boosts an output voltage of an input source and outputs the output voltage which has been boosted, wherein the DC-DC converter has:
a boost coil; and
a capacitor, and
the control circuit comprises:
an input terminal into which the output voltage is input;
a first transistor arranged between the input terminal and the boost coil and the capacitor; and
a switch activation unit which boosts the output voltage, and applies the output voltage, which has been boosted, to a control terminal of the first transistor; and
a high voltage selector circuit which selects a voltage that is applied to the control terminal of the first transistor, wherein
the high voltage selector circuit selects whichever is higher of a switch activation voltage boosted by the switch activation unit, and a boost voltage boosted by a boost operation of the DC-DC converter.

* * * * *